United States Patent [19]
Poloni et al.

[11] Patent Number: 5,790,229
[45] Date of Patent: Aug. 4, 1998

[54] TEMPLE FOR SPECTACLES

[75] Inventors: Antonio Poloni; Gianfranco Bonifaccio, both of Montebelluna, Italy

[73] Assignee: Togna Service S.r.l., Montebelluna, Italy

[21] Appl. No.: 828,513

[22] Filed: Mar. 31, 1997

[30] Foreign Application Priority Data

Feb. 20, 1997 [IT] Italy .................. MO97A0021

[51] Int. Cl.⁶ .................. G02C 5/14; G02C 5/20
[52] U.S. Cl. .................. 351/123; 351/111; 351/118; 351/120
[58] Field of Search .................. 351/123, 118, 351/119, 120, 111, 41, 113, 114, 121, 122

[56] References Cited

U.S. PATENT DOCUMENTS 4,820,034  4/1989  Anger .................. 351/123

FOREIGN PATENT DOCUMENTS

| | | |
|---|---|---|
| 0170721 | 2/1986 | European Pat. Off. . |
| 0232462 | 8/1987 | European Pat. Off. . |
| 0588216 | 3/1994 | European Pat. Off. . |
| 0698801 | 2/1996 | European Pat. Off. . |
| 2604800 | 4/1988 | France . |
| 9624877 | 8/1996 | WIPO . |

*Primary Examiner*—Hung X. Dang
*Attorney, Agent, or Firm*—Browdy and Neimark

[57] ABSTRACT

In a temple for spectacles an end part of the temple distal from the spectacle lenses is bent to reverse on itself, in a downwards direction, so as to obtain a longitudinal element which can be distanced from the temple, and which is destined to rest on a user's ear. A mobile element, slidably coupled to the temple, is interpositioned between the temple and the longitudinal element. By displacing the mobile element towards the end of the longitudinal element constrained to the temple, the temple and the longitudinal element can be distanced one from another, an entity of such distancing being variable according to a position of the mobile element along the temple.

12 Claims, 1 Drawing Sheet

U.S. Patent  Aug. 4, 1998  5,790,229
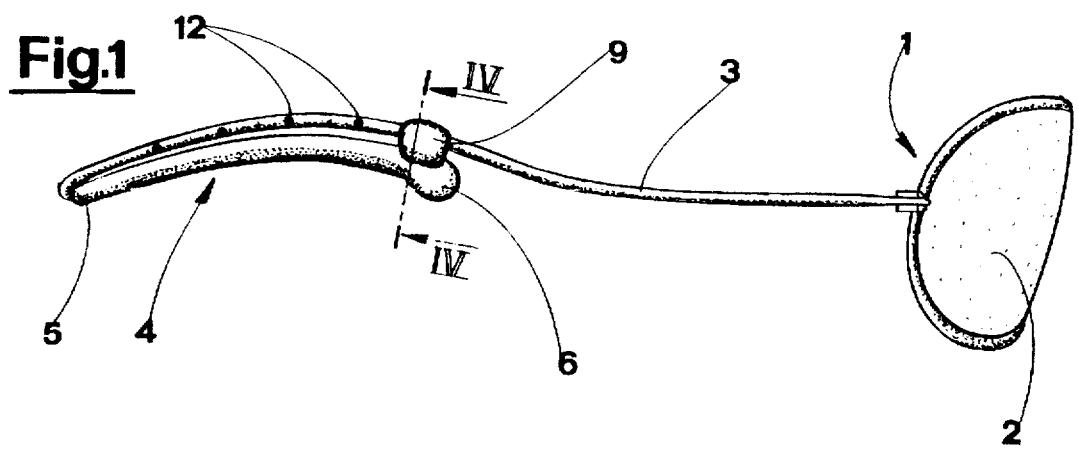
Fig.1
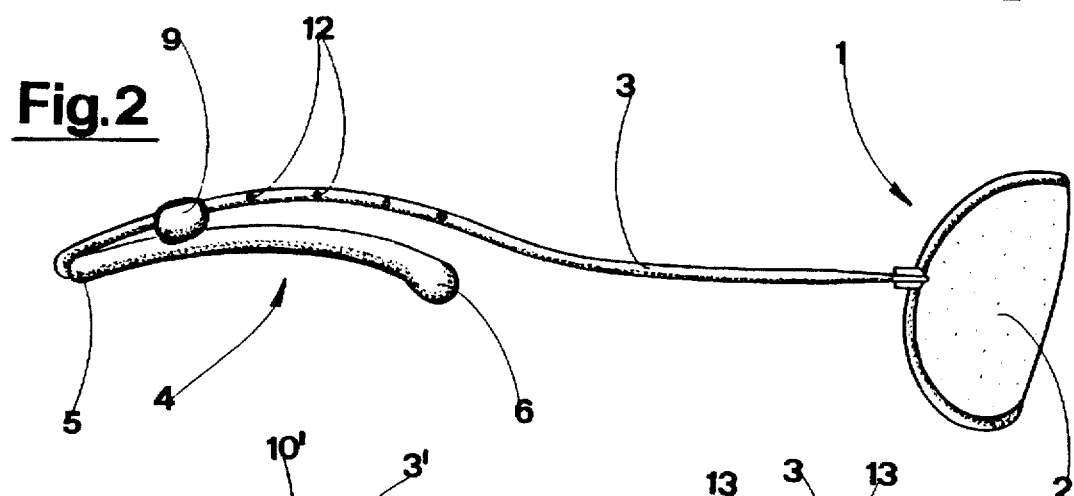
Fig.2
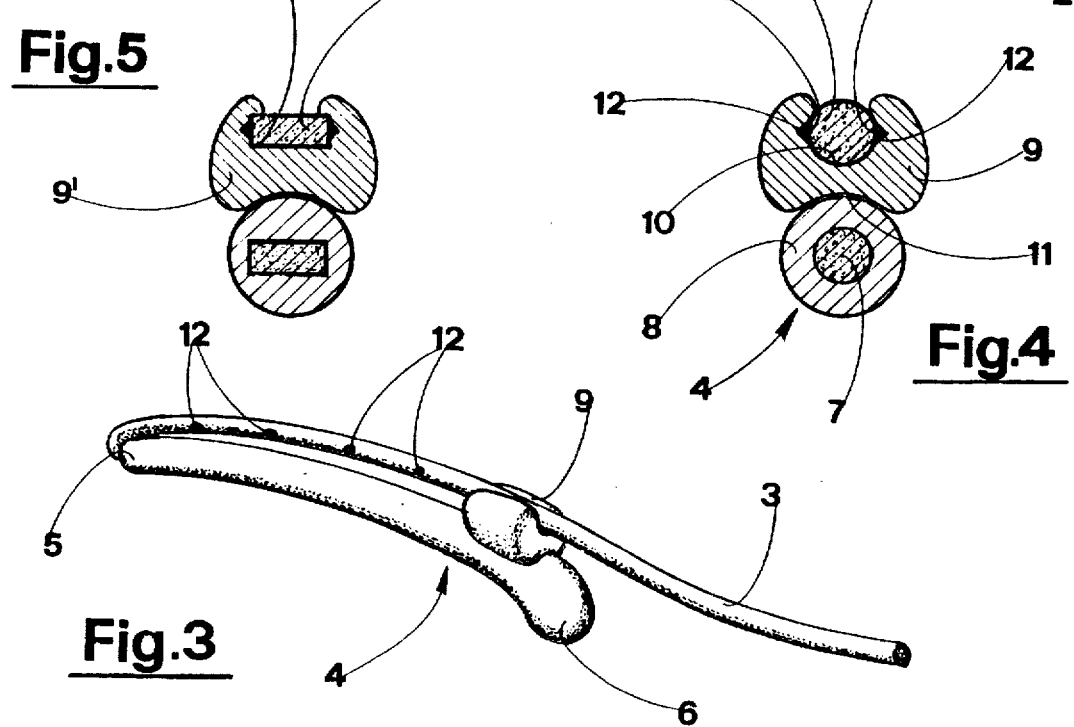
Fig.5
Fig.4
Fig.3

TEMPLE FOR SPECTACLES

BACKGROUND OF THE INVENTION

A problem in known spectacles is that they do not always adapt to the shape of the wearer's face. In particular, it can happen that the inclination of the lenses with respect to the optical axis of the user's eye is not as foreseen; or perhaps the nose rest and ear rest angles are not comfortable for the wearer. The main aim of the present invention is to provide a solution to the abovementioned problem by providing a temple for spectacles which enables the wearer to adapt the spectacles to the form of his or her face.

SUMMARY OF THE INVENTION

An advantage of the present invention is to enable the inclination of the lenses of the spectacles to be modified with respect to the optical axis of the wearer. A further advantage of the present invention is to enable the spectacles to be adapted as above very simply and quickly.

A further advantage of the invention is that it is constructionally simple and economical.

The above aims and advantages are all achieved by the invention, as it is characterized in the appended claims.

BRIEF DESCRIPTION OF THE DRAWINGS

Further characteristics and advantages of the present invention will better emerge from the detailed description that follows of a preferred but non-exclusive embodiment of the invention, illustrated purely by way of non-limiting example in the accompanying figures of the drawings, in which:

FIG. 1 is a lateral view in vertical elevation of a pair of spectacles bearing the temple of the invention;

FIG. 2 is the view of FIG. 1 with the temple in a different configuration;

FIG. 3 is a perspective view of the temple of the invention;

FIG. 4 is an enlarged-scale drawing of a section made according to line IV—IV of FIG. 1;

FIG. 5 is a section as in FIG. 4 relating to a second embodiment of the invention.

DESCRIPTION OF THE PREFERRED EMBODIMENTS

With reference to FIGS. 1–4 of the drawings, 1 denotes in its entirety a pair of spectacles provided with a pair of lenses 2 and a pair of temples 3 made according to the present invention. For reasons of simplicity only one temple 3 is shown in the figures.

The temple 3 comprises an elastically-flexible longitudinal element 4, predisposed below the temple 3 and destined in use to be rested on a wearer's ear. In the previous sentence the preposition "below" was intended to refer to the use configuration of the spectacles 1.

The longitudinal element 4 exhibits a first end 5 constrained to the temple 3 and a free second end 6 opposite said first end 5. The free end 6 of the longitudinal element 4 is twisted towards the first end 5 of the temple 3 bearing the lenses 2 of the spectacles 1. In the example the temple 3 is made of metal and the longitudinal element 4 comprises a part of temple 3 bent back on itself, bent, that is, by simply twisting downwards of the free end 6 of the temple 3, i.e. the opposite end to the one bearing the lens. The longitudinal element 4 is positioned side-by-side with a part of the temple 3. Both the longitudinal element 4 and the part of the temple 3 which is side by side with the longitudinal element 4 exhibit a slight concavity in a downwards-facing direction. In the example the longitudinal element 4 is constituted by a metal core 7 made of the same material as the temple 3, and a plastic (or other material) covering 8 suitable for contact with the user's skin.

The free end 6 of the longitudinal element 4 can be distanced from the temple 3, while the first end 5 remains solidly anchored to the temple 3. In FIG. 2 the longitudinal element 4 and the temple 3 are shown slightly opened out. The longitudinal element 4 naturally tends, through elastic reaction, to return into the position shown in FIG. 1, that is, side-by-side with the temple 3. In use, a different degree of distancing between the longitudinal element 4 and the temple 3 enables a regulation to be obtained of the position of the spectacles 1 on the face of the user, as will be better explained hereinbelow.

The following is a description of a possible and preferred method for obtaining and keeping the desired degree of distancing between the temple 3 and the longitudinal element 4 during use of the spectacles 1. A mobile element 9 is provided with sliding motion along the temple 3. The mobile element 9 is, in fact, provided with a buttonhole recess 10 slidably coupled with the temple 3. The recess 10 is open superiorly so that the temple 3 can be press-inserted in the buttonhole. The coupling between the temple 3 and the recess 10 can be a slight friction-fit, so that the user can manually position the mobile element 9 by sliding it along the temple 3, but at the same time the friction coupling between the internal surface of the recess 10 and the external surface of the temple 3 is such that the mobile element 9 remains stably in the desired position.

Two lines of teeth 12 are predisposed along the temple 3. The teeth 12 project and are equidistanced and engage in two corresponding notches 13 in the internal surface of the recess 10. The coupling between the notches 3 and the teeth 12 stops the mobile element 9 in a plurality of predetermined positions. It is possible, according to a second embodiment of the invention (not illustrated) to position a line of adjustment notches along the temple 3, into which a corresponding projecting element on the mobile element 9 would insert.

The mobile element 9 is conformed and arranged in such a way as to be able to flex the longitudinal element 4 in a downwards direction, the flexion degree being variable according to its position along the temple 3.

The mobile element 9, in fact, is wedge-interpositioned between the temple 3 and the longitudinal element 4 in such a manner that the nearer the element 9 is positioned close to the first end 5, the more the longitudinal element 4 and the temple 3 are distanced by effect of the force exerted by the mobile element 9. The stability of the position of the mobile element 9 on the rod 3 is favored by the elastic pressure of the flexible longitudinal element 4, which tends to near the temple 3, as well, in the specific case being herein described, as by the coupling between a tooth and the relative notch. In FIG. 2 the mobile element 9 is shown in a relatively close position to the constrained first end 5 of the longitudinal element 4; it is obvious how the wedging action of the mobile element 9 between the temple 3 and the longitudinal element 4 determines a certain distancing between those elements.

The mobile element 9 further exhibits a concave lower surface 11 which is predisposed to interact contactingly with the upper surface of the longitudinal element 4, flexing said longitudinal element 4 downwards. The lower surface 11 is also predisposed to slide draggingly on the longitudinal element 4 itself. In a further embodiment of the invention, the interaction between the mobile element and the longitudinal element might be "inverted" with respect to the arrangement described herein; that is, the flexible longitudinal element 4 would tend naturally to remain distanced from the temple 3 and the mobile element 9, sliding on the temple 3, would act to near more or less—according to the position of the temple 3—the two elements (i.e. the temple 3 and the flexible element for resting on the ear). In this way the elements, like in the first embodiment, are distanced in relation to the proximity of the mobile element to the non-free end of the longitudinal element 4.

In the second preferred embodiment the flexible longitudinal element 4 exhibits its free end 6 bent forwards, with reference to the face of the user, that it, towards the lenses 2. This enables, among other things, the flexible longitudinal element 4 to be made by simply bending the temple 3 at a point along its length. With some modification, the free end of the longitudinal element 4 could be bent backwards; in this case the longitudinal element 4 can be obtained by bending the temple 3 on itself at two points, or by applying (by means of welding or other methods) an elastically flexible element manufactured separately.

The mobile element 9 is preferably made of plastic material, while the longitudinal element 4 comprises, as mentioned hereinabove, a metal core covered with plastic; however, other types of materials could be used.

FIG. 5 shows a further embodiment of the invention in which the slide coupling between the mobile element 9' and the temple 3' of the spectacles is angled. The temple 3' exhibits a rectangular-shaped straight transversal section, provided with a superior opening through which the temple 3' can be inserted. The temple 3' and the mobile element 9' are coupled in such a way as to prevent reciprocal rotation about the longitudinal axis of the temple 3'.

In use, the wearer can adjust the position of the spectacles 1, and in particular that of the lenses 2 with respect to the optical axis of the eyes, by moving the mobile element 9 backwards or forwards on the temple 3. In so doing the mobile element 9 interacts contactingly between the longitudinal element 4 which rests on the user's ear, so that the two elements are distanced one from the other if the mobile element 9 is displaced backwards; similarly an elastic return of the longitudinal element 4 on the temple 3 is achieved if the mobile element 9 is displaced forwards. All this can be done while the spectacles are being worn, i.e. resting on the ears and nose of the user. During the adjustment operation the longitudinal elements 4 stay resting on the ears, while by moving the mobile elements 9 forwards or backwards the temple 3 are either lowered or raised, pivoting on the first ends 5 of the longitudinal elements 4. This obviously modifies the trim of the spectacles and especially the lenses on the user's face.

What is claimed:

1. A temple for spectacles, comprising:

a longitudinal element, arranged below said temple and destined in use to rest on a user's ear, having a first end which is constrained to the temple and a free second end, the longitudinal element and the temple being elastically distanceable one from another;

a mobile element provided with sliding movement along the temple, which mobile element can distance the longitudinal element from the temple, an entity of a distance attained being variable according to a position of said mobile element along said temple.

2. The temple of claim 1, wherein the mobile element is interpositioned between the longitudinal element and the temple, and the mobile element is able to interact contactingly with the longitudinal element to cause the longitudinal element to distance from the temple; said longitudinal element and said temple being distanced more or less depending on a positioning of said mobile element closer to or further from said first end.

3. The temple of claim 1, wherein said longitudinal element comprises a part of an end of the temple bent back on itself.

4. The temple of claim 1, wherein the mobile element is provided with a recess slidably coupled with the temple.

5. The temple of claim 4, wherein the recess is superiorly open to enable the temple to be press-fitted therein.

6. The temple of claim 4, wherein a coupling between the temple and the recess is a slight friction-coupling.

7. The temple of claim 4, wherein the sliding couple between the temple and the recess is prismatic-angled, such as to prevent reciprocal rotation between the temple and the mobile element with respect to a longitudinal axis of the temple.

8. The temple of claim 1, wherein the mobile element comprises a concave lower surface for contactingly interacting with the longitudinal element, and for sliding on the longitudinal element.

9. The temple of claim 1, wherein the longitudinal element comprises a metal core covered with plastic material.

10. The temple of claim 1, wherein the longitudinal element is slightly concave in a downwards-facing direction.

11. The temple of claim 1, wherein said free end of said longitudinal element is bent towards an end of the temple constrained to the lenses of the spectacles.

12. The temple of claim 1, comprising means for stopping the mobile element on the temple in a plurality of predetermined positions, said means for stopping preferably comprising at least a line of projecting teeth, reciprocally distanced, predisposed on the temple, which teeth can engage in a corresponding notch made on the mobile element.

* * * * *